Figure 1:
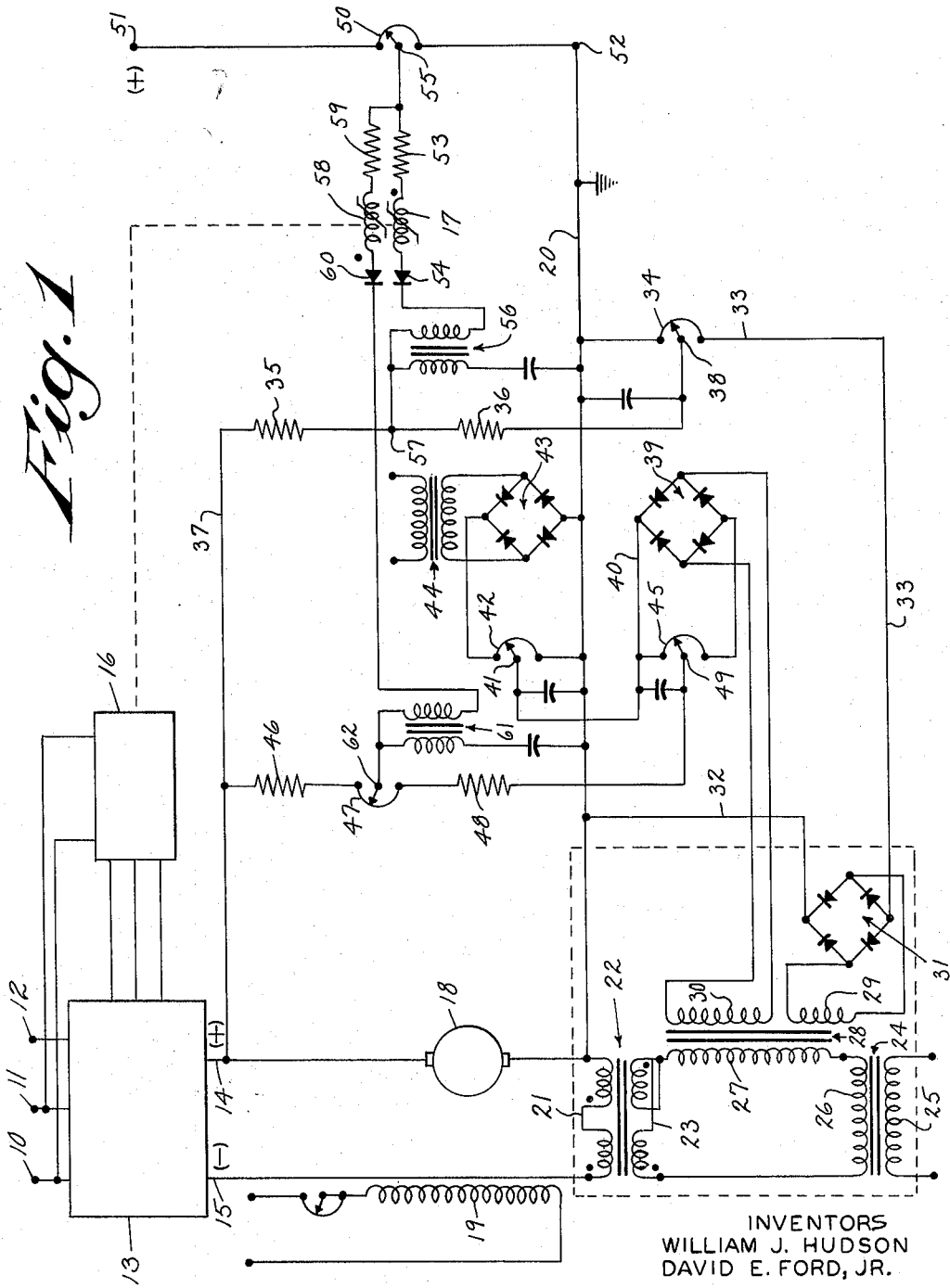

May 24, 1966     W. J. HUDSON ETAL     3,253,204
CURRENT LIMIT CONTROL FOR D.C. MOTORS
Filed Nov. 14, 1963     2 Sheets-Sheet 2

INVENTORS
WILLIAM J. HUDSON
DAVID E. FORD, JR.

BY
Thomas W. Ehrmann

ATTORNEY

United States Patent Office 3,253,204
Patented May 24, 1966

3,253,204
CURRENT LIMIT CONTROL FOR D.C. MOTORS
William J. Hudson and David E. Ford, Jr., Milwaukee, Wis., assignors to Allen-Bradley Company, Milwaukee, Wis., a corporation of Wisconsin
Filed Nov. 14, 1963, Ser. No. 323,645
9 Claims. (Cl. 318—308)

This invention relates to current limit control of D.C. motors, and resides particularly in a current limit control for a D.C. shunt motor including means by which the motor armature current will automatically produce a control feedback signal to limit the armature current to a preadjusted maximum value.

A common type of D.C. shunt motor control system incorporates a controller which draws its power from A.C. lines, either single phase or poly phase, and rectifies the alternating current into a unidirectional current power input for the motor armature. The controller may provide the rectification by static rectifiers, such as thyratrons, ignitrons, and silicon controlled rectifiers. The output of the static rectifiers is varied in intensity by varying the electrical angle within a possible 180° at which each rectifier element is first allowed to initiate current flow. Accurate control of the speed or torque of the D.C. motor by control of the voltage applied across the motor armature is achieved by manipulating the controller by the use of some form of transducer which will cause a shifting of the electrical angle at which the static rectifiers fire in response to a variation in the value of a small direct current flowing in a control coil of the transducer.

A reference voltage indicative of the desired motor speed is matched with a feedback voltage of the motor armature to control the current flowing in the control coil. By making the reference voltage adjustable for selection of a desired motor speed, the transducer will manipulate the controller to provide a unidirectional current power input to the motor armature of an intensity which will yield the desired speed.

A problem in the operation of any D.C. shunt motor is the necessity of providing some means of limiting the armature current upon starting of the motor until such time as the counter electromotive force has built up, or to limit the armature current on running overloads for electrical protection of the motor and power supply equipment and for protection of the driven load against shock. Upon the starting of the motor the armature current is very high, and upon stalling of the motor by overload the armature current again is very high.

Prior apparatus to protect against damage by excessive armature current have included overload relays which remove the input voltage upon excessive armature current. This has the disadvantage of requiring resetting of the motor upon removal of the overload since control over the motor has been lost and, therefore, down time of the equipment results. A second form of protection against armature current overloads has included placing a resistance in series with the motor armature which is removed, at least in part, when the armature current falls below the normal full-load valve. Existing motor control systems with current limit control have proven uneven in operation with the result that undesirable vibrations are set up in the driven equipment and cause chattering when the armature current is being held at its limiting value.

It is a principal object of this invention to provide an improved current limit control which prevents the armature current of a D.C. shunt motor from ever exceeding a maximum value which it is estimated might cause damage to the electrical driving apparatus or excessive shock to the driven machinery.

It is another object of this invention to provide a current limit control for a D.C. shunt motor with speed control in which the current limiting function is initiated quickly and smoothly when the counter torque of the driven load for any reason momentarily exceeds the driving torque represented by the limiting current, without affecting the normal functions of the speed control at any lower values of armature current.

It is a further object of this invention to provide a current limit control for a D.C. shunt motor in which the motor armature current is limited to a preset maximum value as the motor accelerates to a selected speed and, if the motor has been slowed down or stalled by a running overload, in which the motor is caused to resume speed with current limit protection if and when the current overload condition has been relieved.

The foregoing and other objects and advantages of this invention will appear from the description which follows. In the description, reference is made to the accompanying drawings which form a part hereof and in which is shown by way of illustration specific forms in which the invention may be practiced. These forms will be described in sufficient detail to enable those skilled in the art to practice the invention, but it is to be understood that other embodiments of the invention may be used and that changes may be made in the embodiments described without departing from the scope of the invention. Accordingly, the following detailed description is not to be taken in a limiting sense and the scope of the present invention is best defined by the appended claims.

Figure 2:
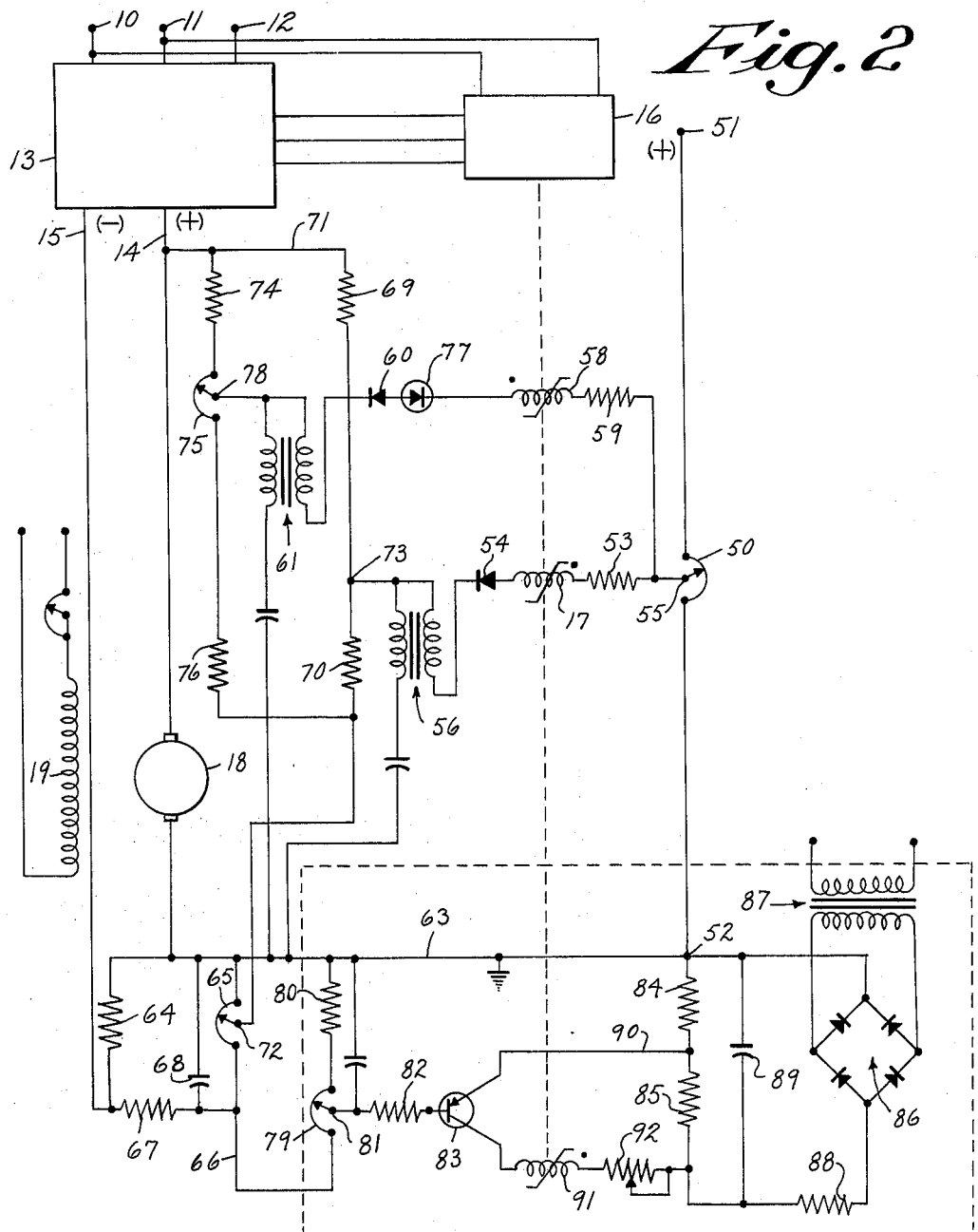

In the drawings:

FIG. 1 is a schematic diagram of a circuit embodying one form of the current limit control of the invention; and FIG. 2 is a schematic diagram of a circuit embodying an alternate form of the current limit control of the invention.

Referring to FIG. 1, input terminals 10, 11 and 12 are adapted for connection across a suitable source of alternating current. The alternating current source may be either single or poly phase. A controlled rectifier unit 13 receives its input from the input terminals 10, 11 and 12 and is adapted to rectify the alternating current to a substantially direct current output. The controlled rectifier unit 13 is well known in the art and may include static rectifiers such as thyratrons, ignitrons or silicon controlled rectifiers. The power output of the controlled rectifier unit 13, which is produced across a positive output lead 14 and a negative output lead 15, may be varied in intensity by varying the electrical angle within a possible 180° maximum at which each rectifier element is first allowed to initiate current flow. That is, the voltage applied across the output leads 14 and 15 may be controlled by controlling the firing time of the rectifier elements and the function of controlling the firing time of the rectifier elements is performed by a firing device 16 powered from the input terminals 10 and 11 and connected to the controlled rectifier unit 13.

The firing device 16 is also well known in the art and normally is formed of a transducer which will cause the shifting of the electrical angle at which the power rectifier elements fire. The firing device 16 responds to a variation in the value of a direct current flowing in a control coil 17 which forms a part of the transducer firing device 16, or a part of a preamplifier of the firing device 16. The controlled rectifier unit 13 and firing device 16 including the control coil 17, and which is known generally as an electronic adjustable voltage speed controller, is well known in the art to control the speed or torque of a D.C. shunt motor having an armature 18 and a shunt field winding 19.

In FIG. 1, the motor armature 18 is shown connected at one side to the positive lead 14 and at its other side to a base line conductor 20 which may be considered to be ground. One end of a primary winding 21 of a transductor, or D.C. transformer, 22 is likewise connected to the base line conductor 20. The input lead 15 connects to the second end of the primary windings 21 of the transductor 22. The primary winding 21 of the transductor 22 comprises a pair of windings connected for identical polarity, and a secondary winding 23 of the transductor 22 includes a pair of windings connected for opposite polarity.

A power transformer designated generally as 24 has its primary windings 25 connected to a suitable source of alternating current (not shown). The secondary winding 26 of the power transformer 24 is connected at one end to the secondary winding 23 of the transductor 22 and at the other end to one end of a primary winding 27 of a transformer 28. The other end of the primary winding 27 of the transformer 28 is connected to the other end of the secondary winding 23 of the transductor 22. The transformer 28 has a pair of secondary windings 29 and 30.

With the motor in operation, a current which is the motor armature current will flow through the primary windings 21 of the transductor 22. This current is made up of a unidirectional component, which is the useful portion which produces torque at the motor shaft, plus a non-useful superimposed A.C. ripple which is an unavoidable result of the method of producing the current. In passing through the transductor primary windings 21, the transformer action produced by the A.C. ripple component is aborted in the two secondary windings 23 by reason of the reversed connection, whereas the unidirectional component produces a saturation of the core material which controls the sensitivity of both of the coils making up the secondary windings 23 of the transductor 22 without producing any net voltage between the input and output ends of their common circuit. Therefore, when the power transformer secondary winding 26 is connected to pass current through the transformer primary winding 27 and the transductor secondary windings 23, the latter functions as a variable inductance to absorb most of the input voltage if the motor current is small and a proportionately smaller part of the input voltage as the voltage is increased. The portion of the input voltage not absorbed by the transductor is taken up by the primary winding 27 of the transformer 28, so that this voltage is substantially proportional to the unidirectional component of the motor armature current. Therefore, A.C. voltages will be induced in the secondary windings 29 and 30 of the transformer 28 which are proportional to the armature current. The principle of the transductor, or D.C. transformer, is old in the art and its operation has been described in some detail to clarify its application in the present invention. Instead of the transductor arrangement illustrated and described, any transducer which converts armature current to usable voltage levels could be employed. For example, a current transformer could be used.

The ends of the secondary winding 29 of the transformer 28 are connected to the input corners of a bridge rectifier 31. The positive output corner of the bridge rectifier 31 is connected by a conductor 32 to the base line conductor 20. The negative output corner of the bridge rectifier 31 is connected by a conductor 33 to one side of an IR compensation potentiometer 34 whose other side is connected to the base line conductor 20. A voltage divider in the form of a pair of serially connected resistors 35 and 36 are connected across a conductor 37 and a brush 38 of the IR compensation potentiometer 34. The conductor 37 is connected to the positive lead 14.

The secondary winding 30 of the transformer 28 is likewise connected to the input corners of the bridge rectifier 39. The positive output corner of the bridge rectifier 39 is connected by a conductor 40 to the brush 41 of a positive bias potentiometer 42. The potentiometer 42 is connected across the base line conductor 20 and the positive output corner of a bridge rectifier 43 whose negative output corner is connected to the base line conductor 20. The input of the bridge rectifier 43 is provided from a suitable A.C. source operating through a transformer 44, however any suitable direct current source may be used across the potentiometer 42.

A lower current limit potentiometer 45 is connected across the output corners of the bridge rectifier 39. A second voltage divider network which includes a resistor 46, an upper current limit potentiometer 47, and a resistor 48 connected in series is connected across the conductor 37 and a brush 49 of the lower current limit potentiometer 45.

A speed adjustment potentiometer 50 is connected across a D.C. source applied to terminals 51 and 52. The control coil 17, a resistor 53 and a diode 54 are connected in series from a brush 55 of the speed adjustment potentiometer 50 to a ripple filter designated generally by reference numeral 56. The ripple filter 56 in turn is connected to a junction point 57 between the resistors 35 and 36 of the first voltage divider network. Any suitable form of ripple filter may be employed. A suicide coil 58 together with a resistor 59 and a diode 60 are connected in series also from the brush 55 of the speed adjustment potentiometer 50 to a second ripple filter 61 which in turn connects to a brush 62 of the upper current limit potentiometer 47.

With the speed adjustment potentiometer 50 set at a reference voltage which is to yield a desired speed of the motor and the controlled rectifier 13 applying power to the armature 18 of the motor, a voltage will appear across the conductor 37 and the base line conductor 20 which is proportional to the voltage applied to the motor armature 18 across the leads 14 and 15. Such voltage is, therefore, proportional to the counter electromotive force plus the IR drop across the motor armature 18. A voltage proportional to the armature current will be established across the conductor 33 and the base line conductor 20 and this voltage will be negative with respect to the base line 20. The voltage appearing across the junction point 57 and the brush 38 will likewise be proportional to the input voltage applied to the armature 18. The IR compensation potentiometer 34 is employed to pick off a portion of the voltage appearing across the conductor 33 and the base line conductor 20, which voltage is proportional to the armature current. Thus, the voltage appearing across the junction point 57 and the base line 20 will be proportional to the counter electromotive force developed in the motor armature 18.

Looking now only at the circuitry for the control coil 17 which is similar to that found in the prior art, were the motor to stall under overload, the counter electromotive force would decrease and the armature current would increase. Therefore, the potential of the junction point 57 relative to the base line 20 would decrease and would then be at a potential less than that of the brush 55 of the speed adjustment potentiometer 50. Current would then flow from right to left as viewed in FIG. 1 through the control coil 17. In the prior art devices and in the present current limit control, the greater the control coil current, the larger will be the voltage applied across the input leads 14 and 15 since the control coil 17 will, under increasing current passing through it, cause the firing angle to advance and thereby cause the rectifier elements of the controlled rectifier 13 to conduct for a greater period of time during each half cycle. The result would be an increased voltage applied across the leads 14 and 15 when the motor was stalled. Since the counter electromotive force would be zero or close to zero, the increased voltage would have to be taken up by an increase in the armature current. Such increase could be well the limits for protection of the motor and the driven equipment.

The function of the suicide coil 58 is to pass a current to affect the firing device 16 when the armature current has increased beyond an established limit. The suicide coil 58 is connected for opposite polarity to that of the control coil 17. Thus, a current flowing in the suicide coil 58 from right to left as viewed in FIG. 1 will offset the effect of the control coil 17. For example, equal currents flowing simultaneously through the control coil 17 and the suicide coil 58 will have a null effect upon the firing device 16.

As indicated earlier, the voltages across the IR compensation potentiometer 34 and the lower current limit potentiometer 45 are both proportional to the armature current. The input voltages supplied to the IR compensation bridge rectifier 31 and the lower current limit bridge rectifier 39, respectively, may be equal or unequal depending upon considerations of design, but the portions of these voltages which are utilized in the functioning of the control system are determined by the setting of the brush of potentiometer 34 for IR compensation and by the setting of the brush of potentiometer 45 for current limit. Thus, a voltage proportional to armature current appears across the brush 38 and the base line conductor 20 but the related voltage for the current limit circuit appearing across the brush 49 and the conductor 40, which is also proportional to armature current, is greater by, for example, four times the voltage across the brush 38 and the base line conductor 20. However, the positive end of the current limit potentiometer 45 is not connected to the base line conductor 20 as is the IR compensation potentiometer 34 for the control coil, but rather is connected to the brush 41 of the bias potentiometer 42 so that it is positively biased above ground. Since the voltage across the brush 62 of the upper current limit potentiometer 47 and the brush 49 of the lower current limit potentiometer 45 will again be proportional to the voltage applied across the leads 14 and 15, the voltage across the brush 62 and the base line conductor 20 will be proportional to the counter electromotive force but biased at a constant value above ground by the setting of the bias potentiometer 42.

Now, when the speed adjustment potentiometer 50 is set to maintain a certain speed of the motor, and the motor is suddenly overloaded, the counter electromotive force will decrease and the armature current will increase thereby again reducing the potential of the junction point 57 relative to the base line conductor 20 and will also reduce the potential of the brush 62 relative to the base line conductor 20. The voltage gradient will furthermore be much greater for the voltage divider network including the suicide coil 58 than for that including the control coil 17 since the current limit voltage drop in the suicide coil circuit is substantially greater than the related IR compensation drop in the control coil circuit. However, because of the positive bias supplied by the bias potentiometer 42 and by adjustment of the suicide coil circuit, the potential of the brush 62 is established at the potential of the reference voltage as set up on the speed adjustment potentiometer 50 when the armature current is at the level at which it is desired to limit the armature current. That is, until the armature current has increased to the level at which it is to be limited, the potential of the brush 62 will be greater than that of the brush 55 and no current will pass through the suicide coil 58. This limiting level will generally be between 100% and 200% of the rated armature current of the motor and can generally be established at 150% of the rated armature current.

As soon as the armature current increases beyond the value at which it is desired to limit the same, the potential of the brush 62 of the upper current limit potentiometer 47 in the suicide coil circuit will fall below the reference voltage established by the speed adjustment potentiometer 50 and a current will flow through the suicide coil 58. Thus, when the armature current exceeds the limiting value, a current will flow through both the control coil 17 and the suicide coil 58, but increases in the armature current will result in a greater increase in current in the suicide coil 58 than in the control coil 17. The effect of the foregoing will be to have the suicide coil 58 offset the effect of the control coil 17 on the firing device 16 so that the net result of the operation of the control coil 17 and the suicide coil 57 will be to have the firing device 16 adjust the firing point of the control rectifier unit 13 to a point at which the voltage applied across the leads 14 and 15 will be held at a level that will maintain the armature current at no more than the limiting value. When the overload is removed, the transition back to control of the firing device 16 by the control coil 17 alone is smooth and positive, and occurs as soon as the armature current falls below the limiting value.

The current limit control of this invention will also protect against high initial armature currents upon starting of the motor. That is, upon starting of the D.C. shunt motor the armature current will increase until the limiting value is reached. At such time, the counter electromotive force is negligible. When the limiting value of the armature current is reached the suicide coil 58 will be supplied with a current to work against the control coil 17 with the result of maintaining the voltage applied across the leads 14 and 15 to a proper level for the limiting value of the armature current.

It will be appreciated that in the embodiment of FIG. 1, feedback voltages are applied to both the control coil circuit and the suicide coil circuit. Such feedback voltages include a voltage proportional to motor counter electromotive force, and this is nearly equal for the two circuits, and a voltage proportional to armature current and this voltage is much stronger for the suicide coil circuit than the control coil circuit. The suicide coil circuit is further adjusted by means of the bias potentiometer 42 and the upper current limit potentiometer 47 so that no current flows in the suicide coil 58 until the armature current is at the limiting value. Further, by the use of the bias potentiometer 42 the potential of the brush 62 is never allowed to fall below the potential of the junction point 57 so that the suicide coil cannot take over control of the firing transducer 16.

Referring now to FIG. 2, there is shown therein an alternate form of current limit control in accordance with the present invention. The same reference numerals will be employed in the discussion of the circuit of FIG. 2 for those elements which are common to both embodiments of the present invention.

As in the embodiment previously described, the firing device 16 and control rectifier 13 comprise an electronic adjustable voltage speed controller with controlled voltage output across leads 14 and 15. The armature 18 of the D.C. motor is connected at one side to the positive lead 14 and at its other side connects to a base line conductor 63 which may be considered ground. One side of a drop resistor 64 is connected to the base line conductor 63 and the other side is connected to the negative lead 15.

The voltage across the drop resistor 64 is placed across an IR compensation potentiometer 65 connected at its positive end to the base line conductor 63 and at its negative end to a conductor 66. An RC filter in the form of a resistor 67 and a capacitor 68 filters the unidirectional current fed to the IR compensation potentiometer 65. A voltage divider network in the form of serially connected resistors 69 and 70 is connected across a conductor 71 connected to the positive lead 14 and a brush 72 of the IR compensation potentiometer 65. This voltage divider network is a portion of the circuit for the control coil 17.

A D.C. voltage is imposed across positive terminal 51 and negative terminal 52 which is a junction point on the base line conductor 63. The D.C. voltage imposed across the terminals 51 and 52 is placed across the speed adjustment potentiometer 50, and the control coil 17 is connected in series with the resistor 53, the diode 54, and the ripple filter 56 across the brush 51 of the speed adjustment potentiometer 50 and a junction point 73 on the voltage divider network between the resistors 69 and 70.

A voltage divider network for the suicide coil 58 which includes a resistor 74, an upper current limit potentiometer 75, and a resistor 76 connected in series, is connected across the conductor 71 and the voltage divider network of the control coil so as also to be connected to the brush 72 of the IR compensation potentiometer 65. The suicide coil 58 is connected in series with the resistor 58, the diode 59, a zener diode 77 and the ripple filter 61 across the brush 55 of the speed adjustment potentiometer 50 and a brush 78 of the upper current limit potentiometer 75. Again, any suitable ripple filter may be employed.

The negative side of the IR compensation potentiometer 65 is connected by the conductor 66 to one side of a voltage divider including a potentiometer 79 and a resistor 80 connected at their opposite ends to the base conductor 63. A brush 81 of the potentiometer 79 is connected through a resistor 82 to the base of a PNP transistor 83. A voltage divider comprising resistors 84 and 85 is connected at one end to the base line conductor 63 and at its other end to the negative output corner of a bridge rectifier 86. The positive output corner of the bridge rectifier 86 is also connected to the base line conductor 63. The input corners of the bridge rectifier 86 are supplied with alternating current from an A.C. source through a transformer 87. An RC filter in the form of a resistor 88 and a capacitor 89 filters the direct current fed to the voltage divider comprising the resistors 84 and 85.

The emitter of the PNP transistor 83 is connected by a conductor 90 to a junction point between the resistors 84 and 85. The collector of the transistor 83 is connected to one side of a trigger coil 91 whose other side is connected through an adjustable resistor 92 to the negative side of the voltage divider of the resistors 84 and 85.

A voltage proportional to the armature current will be produced across the drop resistor 64 and therefore will be established across the IR compensation potentiometer 65. This voltage is negative with respect to the base line conductor 63. Again, other forms of transducers may be used in place of the drop resistor 64 to produce a voltage proportional to armature current at usable levels. A voltage proportional to the voltage applied across the leads 14 and 15 will be established across the conductor 71 and the base line conductor 63 and this voltage is also proportional to the counter electromotive force and the armature current. Since the IR compensation potentiometer 65 is employed to pick off a portion of the voltage proportional to the armature current, the voltages across the junction point 73 and the base line conductor 63 and across the brush 78 of the potentiometer 75 and the base line conductor 63 will both be proportional to the counter electromotive force produced in the armature 18. Thus, the IR compensation potentiometer 65 functions as a lower current limit potentiometer for the suicide coil control circuit.

Since the voltage divider networks for the control coil 17 and the suicide coil 57 are both connected at their negative ends to the brush 72 of the IR compensation potentiometer 65, the voltage gradient of the suicide coil circuit and the control coil circuit will not be sufficiently different to protect against a large overswing of armature current upon a suddenly applied load. That is, the signal for the suicide coil 58 to be energized to stop an overcurrent will not be given until the overcurrent already exists and the suicide coil alone could not stop a large overswing. Some other means are needed to instantly detect and oppose a critical overcurrent and to trigger a substantial decrease in the feedback voltage which will bring the suicide coil 58 into action with a large enough voltage gradient to insure positive control. This triggering function is accomplished by the trigger coil 91. The trigger coil forms a further control coil portion of the firing device 16 and is connected with such polarity that a current flowing from left to right as viewed in FIG. 2 upon the conduction of the transistor 83 will oppose the effects of the control coil 17 in combination with the suicide coil 58.

The trigger coil 91 is made to conduct immediately upon the increase of the armature current beyond the limiting value. To this end, the negative voltage applied to the emitter across the conductor 90 and the base line conductor 63 and produced by the rectified A.C. source acting on the voltage divider of the resistors 84 and 85 is set at a value which approximates the negative voltage from the brush 81 of the potentiometer 79 and the base line conductor 63 when the limiting value of current is flowing in the armature circuit.

The zener diode 77 functions in a manner similar to that of the positive bias potentiometer 42 of the embodiment of FIG. 1. That is, the zener diode 77 functions to prevent the initiation of current through the suicide coil 58 until the feedback voltage applied across the brush 78 and the base line conductor 63 is reduced to a certain level which represents an armature current at the limiting value.

In operation, the speed adjustment potentiometer 50 is set for the desired motor speed. The control coil 17 will assume control of the firing device 16 and thus the voltage applied across the leads 14 and 15. As long as the armature current is below the limiting value, the potential between the brush 55 of the speed adjustment potentiometer and the brush 78 of the upper current limit potentiometer 75 of the voltage divider network for the suicide coil 58 will be less than the breakdown voltage of the zener diode 77 and, therefore, only a small leakage current will flow. At the same time, the potential of the base of the transistor 83 will be more positive than the potential of the emitter thereof and the transistor 83 will not conduct to cause current to flow in the trigger coil 91.

As soon as the armature current increases beyond the limiting value, as by an overload on the motor, the potential of the base of the transistor 83 will become more negative than the potential of the emitter and the transistor 83 will conduct. Full current is, for all practical purposes, passed immediately through the collector of the transistor 83 and thus through the trigger coil 91. At the same time, the increase in the armature current will lower the potential of the potentiometer brush 78 relative to the base line 63 in an amount greater than the breakdown voltage of the zener diode 77 whereby current will flow through the suicide coil 58. The combined effect of the current flow in both the suicide coil 58 and the trigger coil 91 will be to offset the increase in current flow in the control coil 17 so that the firing device 16 will adjust the firing point of the rectifier unit 16 and thereby cause a reduction in the voltage applied across the leads 14 and 15. Thus, the trigger coil 91 triggers the reduction in the input voltage.

It will be seen that in the embodiment of FIG. 2, feedback voltages are applied to both the control coil circuit and the suicide coil circuit. Such feedback voltages are in part proportional to the motor counter electromotive force and in part proportional to armature current, and both parts are nearly equal for the two circuits. The suicide coil circuit is adjusted by means of the zener diode 77 and the upper current limit potentiometer 75 so that no current flows in the suicide coil until the armature current is at the limiting value. Similarly, the trigger coil circuit is adjusted by means of the potentiometer 81 so that no current flows in the trigger coil until the armature current is at the limiting value. Again, the potential of the brush 78 is not permitted to fall below the potential of the junction point 73.

The positive bias potentiometer 42 of FIG. 1 may be replaced with a zener diode similar to the arrangement of FIG. 2. That is, instead of biasing the negative end of the voltage divider of the suicide coil circuit above ground to prevent premature initiation of current in the suicide coil 58, the negative end of the voltage divider may be connected directly to the base line conductor 63 and a zener diode may be employed in series with the suicide coil 58.

A tachometer system, known to the prior art, may be used to obtain the feedback voltage proportional to counter electromotive force for the control coil system. However, it would still be necessary to provide a feedback voltage proportional to armature current in such circuit.

The current limit control of this invention is very smooth and quiet in its operation and does not affect the normal functioning of the speed control system. The current limit control is susceptible of the use of economical components.

We claim:

1. In a D.C. shunt motor control system including controlled rectifier means to apply unidirectional current across the motor armature from an alternating current source and firing transducer means to control said rectifier unit for control of the voltage applied across said armature, the combination of a current limit control comprising: direct current reference voltage means settable for a reference voltage indicative of a desired motor speed; a pair of feedback circuit means each adapted to provide a feedback voltage in part proportional to motor counter electromotive force and in part proportional to armature current; a control coil operable on said firing transducer means to have said firing transducer means increase said voltage applied across said armature under increasing current flow in said control coil, said control coil being connected between said reference voltage means and one of said feedback circuit means to have a current flow through said control coil when the respective feedback voltage is less than said reference voltage; a suicide coil operable on said firing transducer means and connected between said reference voltage means and the other of said feedback circuit means in polarity opposed to that of said control coil to have a current flow through said suicide coil to offset the effect of said control coil when the respective feedback voltage is less than said reference voltage; and means to prevent the passage of current through said suicide coil until the armature current has risen to a predetermined limiting value.

2. In a D.C. shunt motor control system including controlled rectifier means to apply unidirectional current across the motor armature from an alternating current source and firing transducer means to control said rectifier unit for control of the voltage applied across said armature, the combination of a current limit control comprising: adjustable direct current reference voltage means settable for a reference voltage of one polarity and indicative of a desired motor speed; a pair of feedback circuits each adapted to provide a feedback voltage in part proportional to motor counter electromotive force and of said one polarity and in part proportional to armature current and of an opposite polarity; a control coil operable on said firing transducer means to have said firing transducer means increase said voltage applied across said armature under increasing current flow in said control coil, said control coil being connected between said reference voltage means and one of said feedback circuits to have a current flow through said control coil when the respective feedback voltage of said one feedback circuit is less than said reference voltage; a suicide coil operable on said firing transducer and connected between said reference voltage means and the other of said feedback circuits in polarity opposed to that of said control coil to have a current flow through said suicide coil to offset the effect of said control coil when the respective feedback voltage is less than said reference voltage; and means to prevent the passage of current through said suicide coil until the armature current has risen to a predetermined limiting value whereby the motor armature current is limited to said limiting value.

3. In a D.C. shunt motor control system including controlled rectifier means to apply unidirectional current to the motor armature across a pair of leads and from an alternating current source and firing transducer means to control said rectifier means for control of the voltage applied across said leads, the combination of a current limit control comprising: armature current transducer means connected in series with said motor armature across said leads and adapted to produce a feedback voltage proportional to armature current; direct current reference voltage means settable for a reference voltage indicative of a desired motor speed and connected at one end to one side of said armature between said armature and said armature current transducer means; a first feedback voltage divider connected between the other side of said motor armature and said armature current transducer means; a second feedback voltage divider connected between other side of said armature and said armature current transducer means; a control coil operable on said firing transducer means to have said firing transducer means increase said voltage applied across said armature under increasing current flow in said control coil, said control coil being connected between said reference voltage means and said first feedback voltage divider to have a current flow through said control coil when the potential of said first feedback voltage divider is less than said reference voltage; a suicide coil operable on said firing transducer means and connected between said reference voltage means and said second feedback voltage divider in polarity opposed to that of said control coil to have a current flow through said suicide coil to offset the effect of said control coil when the potential of said second feedback voltage divider is less than said reference voltage; and means to prevent the passage of current through said suicide coil until the armature current has risen to a predetermined limiting value.

4. In a D.C. shunt motor control system including controlled rectifier means to apply unidirectional current across the motor armature from an alternating current source and firing transducer means to control said rectifier unit for control of the voltage applied across said armature, the combination of a current limit control comprising: direct current reference voltage means settable for a reference voltage indicative of a desired motor speed; first feedback circuit means adapted to provide a first feedback voltage in part proportional to motor counter electromotive force and in part proportional to armature current; second feedback circuit means adapted to provide a second feedback voltage in part proportional to motor counter electromotive force and which is substantially the same as that of said first feedback voltage and in part proportional to armature current and which is substantially greater than that of said first feedback voltage; a control coil operable on said firing transducer means to have said firing transducer means increase said voltage applied across said armature under increasing current flow in said control coil, said control coil being connected between said reference voltage means and said first feedback circuit means; a diode connected in series with said control coil to conduct when said first feedback voltage is less than said reference voltage to have a current flow in said control coil; a suicide coil operable on said firing transducer means and connected between said reference voltage means and said second feedback circuit means in polarity opposed to that of said control coil; a diode connected in series with said suicide coil to conduct when said second feedback voltage is less than said reference voltage to have a current flow in said suicide coil to offset the effect of said control coil on said firing transducer means;

and means to prevent the passage of current through said suicide coil until the armature current has risen to a predetermined limiting value.

5. In a D.C. shunt motor control system including controlled rectifier means to apply unidirectional current to the motor armature across a pair of leads and from an alternating current source and firing transducer means to control said rectifier means for control of the voltage applied across said leads, the combination of a current limit control comprising: an armature current transducer connected in series with said motor armature across said leads and adapted to produce a voltage proportional to armature current and of one polarity; direct current reference voltage means connected at one end to one side of said armature between said armature and said armature current transducer, said reference voltage means being settable for a reference voltage indicative of a desired motor speed and which is of a polarity opposite to that of said voltage proportional to armature current; a first feedback circuit including a first armature current feedback circuit coupled to said armature current transducer and a first voltage divider connected between the other side of said armature and said first armature current feedback circuit, said first feedback circuit providing a first feedback voltage in part proportional to armature current of said one polarity and in part proportional to motor counter electromotive force of said opposite polarity; a second feedback circuit including a second armature current feedback circuit coupled to said armature current transducer and a second voltage divider connected between said other side of said armature and said second armature current circuit, said second feedback circuit providing a feedback voltage in part proportional to armature current of said one polarity and substantially greater than that of said first feedback voltage and in part proportional to motor counter electromotive force of said opposite polarity and substantially the same as that of said first feedback voltage; a control coil operable on said firing transducer means to have said firing transducer means increase said voltage applied across said armature under increasing current flow in said control coil, said control coil being connected between said first voltage divider and said reference voltage means; a diode connected in series with said control coil to conduct when said first feedback voltage is less than said reference voltage to have a current flow in said control coil; a suicide coil operable on said firing transducer means and connected between said second voltage divider and said reference voltage means in polarity opposed to that of said control coil; a diode connected in series with said suicide coil to conduct when said second feedback voltage is less than said reference voltage to have a current flow in said suicide coil to offset the effect of said control coil on said firing transducer means; and means connected in said second feedback circuit to hold said second feedback voltage above said reference voltage until said armature current rises to a predetermined limiting value.

6. In a D.C. shunt motor control system including a controlled rectifier unit to apply unidirectional current to the motor armature across positive and negative leads and from an alternating current source, and a firing transducer to control said rectifier unit for control of the voltage applied across said leads, the combination of a current limit control comprising: an armature current transducer connected in series with said motor armature between said negative lead and one side of said armature, said armature current transducer including a pair of output windings each producing voltages proportional to armature current; an adjustable direct current source settable for a reference voltage indicative of a desired motor speed, said direct current source being connected at its lower potential end to said one side of said armature between said armature and said armature current transducer; first and second voltage dividers each connected at one end to said positive lead; a first armature current feedback circuit responsive to one of said output windings and connected across said lower potential end of said direct current source and the other end of said first voltage divider to produce a feedback voltage proportional to armature current; a second armature current feedback circuit responsive to the other of said output windings and connected across said lower potential end of said direct current source and the other end of said second voltage divider to produce a feedback voltage proportional to armature current and which is substantially greater than that of said first armature current feedback circuit; a control coil operable on said firing transducer means to have said firing transducer means increase said voltage applied across said armature under increasing current flow in said control coil, said control coil being connected between said first voltage divider and said direct current source; a diode connected in series with said control coil to conduct when the potential of said first voltage divider is less than said reference voltage; a suicide coil operable on said firing transducer and connected between said second voltage divider and said direct current source in polarity opposed to that of said control coil; a diode connected in series with said suicide coil to conduct when the potential of said second voltage divider is less than said reference voltage to have a current flow in said suicide coil to offset the effect of said control coil on said firing transducer; and positive bias means in the connection of said second armature current feedback circuit with said lower potential end of said direct current source to bias the potential of said second voltage divider above the reference voltage until the armature current has risen to a predetermined limiting value, whereby said suicide coil is inactive until the armature current rises to said limiting value and the potential of said second voltage divider will always be greater than the potential of said first voltage divider.

7. In a D.C. shunt motor control system including controlled rectifier means to apply unidirectional current across the motor armature from an alternating current source and firing transducer means to control said rectifier unit for control of the voltage applied across said armature, the combination of a current limit control comprising: direct current reference voltage means settable for a reference voltage indicative of a desired motor speed; a pair of feedback circuit means each adapted to provide a feedback voltage in part proportional to motor counter electromotive force and in part proportional to armature current; an armature current feedback circuit adapted to provide a voltage proportional to armature current; a control coil operable on said firing transducer means to have said firing transducer means increase said voltage applied across said armature under increasing current flow in said control coil, said control coil being connected between said reference voltage means and one of said feedback circuit means to have a current flow through said control coil when the respective feedback voltage is less than said reference voltage; a suicide coil operable on said firing transducer means and connected between said reference voltage means and the other of said feedback circuit means in polarity opposed to that of said control coil to have a current flow through said suicide coil when the respective feedback voltage is less than said reference voltage, a trigger coil operable on said firing transducer means and connected with a polarity the same as that of said suicide coil to offset the effect of said control coil, together with said suicide coil; means responsive to said armature current feedback circuit to have a current flow through said trigger coil when the armature current is substantially at a predetermined limiting value; and means to prevent the passage of current through said suicide coil until the armature current has risen to said predetermined limiting value.

8. In a D.C. shunt motor control system including controlled rectifier means to apply unidirectional current across the motor armature from an alternating current source and firing transducer means to control said rectifier unit for control of the voltage applied across said armature, the combination of a current limit control comprising: direct control reference voltage means settable for a reference voltage indicative of a desired motor speed; a pair of feedback circuit means each adapted to provide a feedback voltage in part proportional to motor counter electromotive force and in part proportional to armature current; an armature current feedback circuit adapted to provide a feedback voltage proportional to armature current; a fixed direct current source providing a voltage substantially equal to said feedback voltage proportional to armature current when the armature current is substantially at a predetermined limiting value; a control coil operable on said firing transducer means to have said firing transducer means increase said voltage applied across said armature under increasing current flow in said control coil, said control coil being connected between said reference voltage means and one of said feedback circuit means; a diode connected in series with said control coil to conduct when the feedback voltage of said one feedback circuit means is less than said reference voltage to have a current flow in said control coil; a suicide coil operable on said firing transducer means and connected between said reference voltage means and the other of said feedback circuit means in polarity opposed to that of said control coil; a diode connected in series with said suicide coil to conduct when the feedback voltage of said other feedback circuit means is less than said reference voltage; a trigger coil operable on said firing transducer means and connected between said armature current feedback circuit and said fixed direct current source in polarity the same as that of said suicide coil; means to prevent the passage of current through said suicide coil until the armature current has risen to said predetermined limiting value; and means connected in the circuit of said trigger coil to permit current flow through said trigger coil when said feedback voltage proportional to armature current is greater than said voltage provided by said fixed direct current source, whereby said trigger coil and said suicide coil will offset the effect of said control coil on said firing transducer means.

9. In a D.C. shunt motor control system including controlled rectifier means to apply unidirectional current to the motor armature across a pair of leads and from an alternating current source and firing transducer means to control said rectifier means for control of the voltage applied across said leads, the combination of a current limit control comprising: an armature current transducer connected in series with said motor armature across said leads and adapted to produce a voltage proportional to armature current and of one polarity; direct current reference voltage means connected at one end to one side of said armature between said armature and said armature current transducer, said reference voltage means being settable for a reference voltage indicative of a desired motor speed and which is of a polarity opposite to that of said voltage proportional to armature current; a first armature current feedback circuit responsive to said armature current transducer to provide a feedback voltage proportional to armature current and of said one polarity; first and second voltage dividers each connected across the other side of said armature and said first armature current feedback circuit; a control coil operable on said firing transducer means to have said firing transducer means increase said voltage applied across said armature under increasing current flow in said control coil, said control coil being connected between said reference voltage means and said first voltage divider, a diode connected in series with said control coil to conduct when the potential of said first voltage divider is less than said reference voltage to have a current flow in said control coil; a suicide coil operable on said firing transducer means and connected between said reference voltage means and said second voltage divider in polarity opposed to that of said control coil; a diode connected in series with said suicide coil to conduct when the potential of said second voltage divider is less than said reference voltage; a zener diode connected in series with said suicide coil to be nonconductive until the potential of said second voltage divider has been lowered by a rise in the armature current to a predetermined limiting value; a fixed direct current voltage source; a second armature current feedback circuit responsive to said armature current transducer to provide a feedback voltage proportional to armature current; a transistor having its base connected to said second armature current feedback circuit and its emitter and collector connected across said fixed voltage source, said base being biased for conduction of said transistor when said armature current is substantially at said limiting value; and a trigger coil operable on said firing transducer means and connected between said transistor and said fixed voltage source in a polarity the same as that of said suicide coil to have current flow in said trigger coil when said transistor conducts, whereby said trigger coil and said suicide coil will offset the effect of said control coil on said firing transducer means.

No references cited.

ORIS L. RADER, *Primary Examiner.*

G. SIMMONS, *Assistant Examiner.*